L. C. VECELIUS.
COMBINED TANK GAGE AND FILLER.
APPLICATION FILED AUG. 25, 1915.
1,232,737.
Patented July 10, 1917.
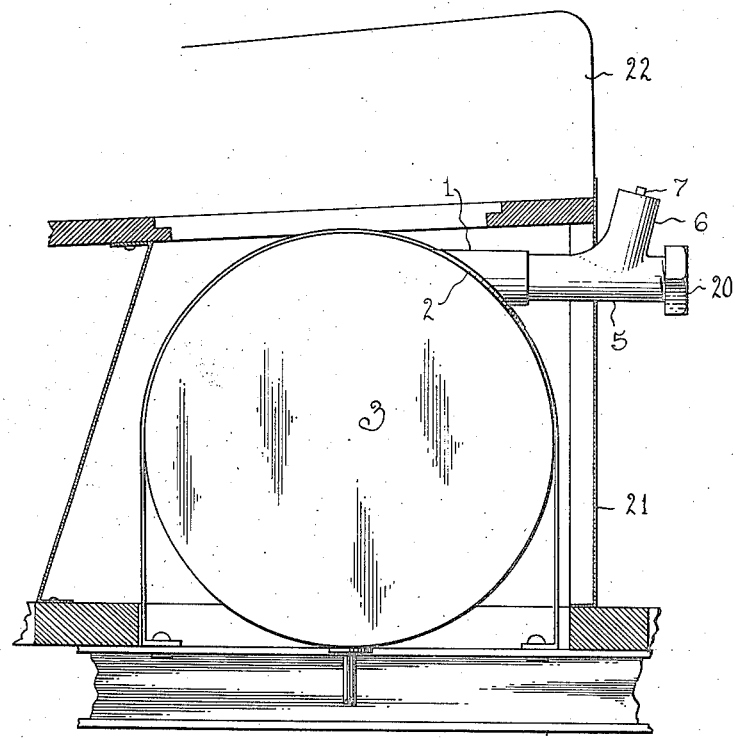
Fig. 1
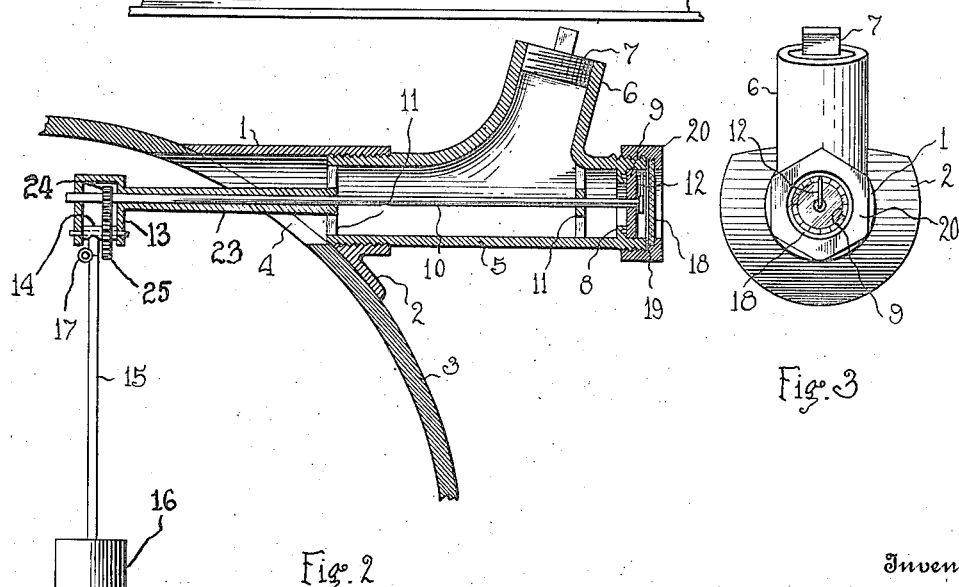
Fig. 2
Fig. 3
Witnesses
Karl H. Butler
Chas. W. Stauffiger
Inventor
Leonard C. Vecelius
By
Bethel & Bethel
Attorneys

UNITED STATES PATENT OFFICE.

LEONARD C. VECELIUS, OF DETROIT, MICHIGAN.

COMBINED TANK GAGE AND FILLER.

1,232,737.  Specification of Letters Patent.  Patented July 10, 1917.

Application filed August 25, 1915. Serial No. 47,357.

*To all whom it may concern:*

Be it known that I, LEONARD C. VECELIUS, a citizen of the United States of America, residing at Detroit, in the county of Wayne and State of Michigan, have invented certain new and useful Improvements in Combined Tank Gages and Fillers, of which the following is a specification, reference being had therein to the accompanying drawings.

This invention relates to a combined tank gage and filler, and the object of my invention is to provide a novel connection which permits of a tank being easily and quickly filled and the quantity in the tank easily determined.

I attain the above object by a connection which has been especially designed for the main gasolene supply tanks of "Ford" automobiles or any automobile wherein the main fuel supply tank is located under the chauffeur's seat or in any inaccessible place. In connection with the Ford gasolene tank, it is necessary that the chauffeur or operator of the automobile remove the seat cushions and the seat board, both of which must be necessarily placed aside while the tank is filled. On account of the limited space in the body of the automobile and the location of the tank, the filling operation cannot be expeditiously performed, but requires care and precision upon the part of the chauffeur. With my improved connection it is unnecessary to remove any part of the seat, as the connection protrudes from the heel-board of the seat and permits of the tank being easily filled with a desired quantity of liquid fuel. The connection also affords a support for a gage which determines the quantity of gasolene within the tank, and the location of the gage is such that it can be easily read.

The construction of the combined tank gage and filler will be hereinafter specifically described and then claimed, and reference will now be had to the drawing wherein—

Figure 1 is an end view of a tank provided with a gage and filler in accordance with my invention;

Fig. 2 is a longitudinal sectional view of the combined tank gage and filler, and Fig. 3 is a front elevation of the same.

The device comprises a socket member 1 provided with a flange 2 conforming in curvature to the wall of a tank 3, and this flange can be brazed or otherwise connected to the tank at an opening 4 thereof. The socket member is interiorly screw-threaded to receive the inner end of the connection 5 and said connection has the top thereof provided with a filling angle branch 6 disposed at an obtuse angle relative to said connection. The branch is provided with a detachable plug 7 or other suitable closure and it is through the medium of this branch that the tank can be filled with gasolene.

The outer end of the connection has an annular interior flange or collar 8 affording a seat for a dial plate 9 and concentric of said dial plate is a shaft 10 journaled in spider bearings 11 forming part of the connection. The outer end of the shaft 10 has a hand or pointer 12 and the inner end thereof extends through a sleeve 23 forming part of one of the bearings 11. The sleeve 23 has a housing 13 for a gear wheel 24 mounted on the shaft 10. In the housing 13 is a rock shaft 14 provided with a gear wheel 25 meshing with the gear wheel 24, and said rock shaft supports a float arm 15 having a float 16. The float arm 15 has a rule joint 17 whereby the gage may be easily installed.

A transparent plate 18 and a gasket 19 are held on the outer end of the connection 5 by an apertured cap or nut 20.

As shown in Fig. 1 the tank is located below a seat 22 and behind a heel board 21, with the connection 5 extending through the heel board and the branch of said connection at such an angle that the plug 7 can be removed and gasolene poured into the connection without disturbing cushions of the seat. The location of the gage is such that it can be easily read and is of a conventional form constituting means for determining when the gasolene tank needs replenishing.

One embodiment of my invention has been illustrated, but it is to be understood that the structural elements are susceptible to such variations and modifications as fall within the scope of the appended claim.

What I claim is:—

The combination with an automobile seat, a gasolene tank below said seat, and a heel board in front of said tank, of a socket member connected to a wall of said tank adjacent the top thereof and disposed in a horizontal plane tangentially of the periphery of said tank and communicating therewith, a connection extending through said heel board into said socket member and having a bearing extending into said tank, a filling branch on top of said connection adjacent the outer side of said heel board, a detachable plug in said filling branch, and a gage carried by the outer end of said connection and the bearing thereof to indicate the quantity of gasolene in said tank.

In testimony whereof I affix my signature in presence of two witnesses.

LEONARD C. VECELIUS.

Witnesses:
 ANNA M. DORR,
 KARL H. BUTLER.